United States Patent
Lee et al.

(10) Patent No.: US 10,465,098 B2
(45) Date of Patent: Nov. 5, 2019

(54) OPTICAL ADHESIVE SHEET

(71) Applicant: LG Chem, Ltd., Seoul (KR)

(72) Inventors: Joo-Hyun Lee, Gyeonggi-do (KR);
Jang-Soon Kim, Gyeonggi-do (KR);
Bu-Gi Jung, Gyeonggi-do (KR);
Sang-Hwan Kim, Gyeonggi-do (KR);
Sung-Chan Park, Seoul (KR);
Chan-Oh Yoon, Chungcheongbuk-do (KR); Han-Na Lee, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/510,403

(22) PCT Filed: Jun. 23, 2015

(86) PCT No.: PCT/KR2015/006380
§ 371 (c)(1),
(2) Date: Mar. 10, 2017

(87) PCT Pub. No.: WO2016/039521
PCT Pub. Date: Mar. 17, 2016

(65) Prior Publication Data
US 2017/0253771 A1    Sep. 7, 2017

(30) Foreign Application Priority Data

Sep. 11, 2014  (KR) .................. 10-2014-0120138

(51) Int. Cl.
*C09J 7/00* (2018.01)
*C08F 220/18* (2006.01)
(Continued)

(52) U.S. Cl.
CPC ............... *C09J 7/00* (2013.01); *C08F 220/18* (2013.01); *C08F 265/06* (2013.01); *C09J 4/06* (2013.01);
(Continued)

(58) Field of Classification Search
CPC ...... C09J 2201/36; C09J 2433/00; C09J 7/00; C09J 133/066; C09J 133/00; C09J 133/04;
(Continued)

(56) References Cited

U.S. PATENT DOCUMENTS 7,465,767 B2    12/2008 Simal et al.
2009/0036626 A1*    2/2009 Tanaka .................. B32B 7/12
526/273

(Continued)

FOREIGN PATENT DOCUMENTS

CN    102186939 A    9/2011
JP    2013213075 A    10/2013
(Continued)

OTHER PUBLICATIONS

International Search Report from PCT/KR2015/006380, dated Aug. 7, 2015.
(Continued)

*Primary Examiner* — Maria V Ewald
*Assistant Examiner* — Daniel P Dillon
(74) *Attorney, Agent, or Firm* — Lerner, David, Littenberg, Krumholz & Mentlik, LLP

(57) ABSTRACT

The present invention provides an optical adhesive sheet including a layered structure of a first adhesive layer and a second adhesive layer, in which the first adhesive layer has a glass transition temperature of −50° C. to −30° C. and a modulus of $0.3 \times 10^5$ Pa to about $0.6 \times 10^5$ Pa, and the second adhesive layer has a glass transition temperature of −20° C. to −10° C. and a modulus of $0.7 \times 10^5$ Pa to $1.0 \times 10^5$ Pa.

13 Claims, 1 Drawing Sheet

(51) Int. Cl.
  *C08F 265/06* (2006.01)
  *C09J 4/06* (2006.01)
  *G02B 1/04* (2006.01)
  *C09J 7/10* (2018.01)
  *C09J 133/06* (2006.01)

(52) U.S. Cl.
  CPC .................. *C09J 7/10* (2018.01); *G02B 1/04* (2013.01); *C09J 133/066* (2013.01); *C09J 2201/36* (2013.01); *C09J 2201/606* (2013.01); *C09J 2201/622* (2013.01); *C09J 2203/318* (2013.01); *C09J 2433/00* (2013.01)

(58) Field of Classification Search
  CPC . C09J 143/04; C08F 4/16; C08F 20/00; C08F 120/00; C08F 220/00; C08F 222/00; A61K 8/8152; B32B 27/00
  See application file for complete search history.

(56) References Cited

U.S. PATENT DOCUMENTS

| | | | |
|---|---|---|---|
| 2011/0112249 A1 | 5/2011 | Takarada et al. | |
| 2011/0149211 A1 | 6/2011 | Ha et al. | |
| 2011/0195240 A1 | 8/2011 | Inenaga | |
| 2013/0164478 A1* | 6/2013 | Yamamoto | B32B 7/12 428/41.8 |
| 2014/0120321 A1* | 5/2014 | Chiao | C09J 133/14 428/174 |
| 2014/0168544 A1* | 6/2014 | Niimi | G02B 5/3033 349/12 |
| 2014/0178608 A1* | 6/2014 | Yoon | G02B 5/30 428/1.55 |

FOREIGN PATENT DOCUMENTS

| | | |
|---|---|---|
| KR | 101114277 B1 | 3/2012 |
| KR | 101114361 B1 | 3/2012 |
| TW | 201134897 A | 10/2011 |
| TW | 201247832 A | 12/2012 |
| WO | 2014130507 A1 | 8/2014 |

OTHER PUBLICATIONS

Chinese Search Report for Application No. 201580048562.6, dated Jun. 3, 2019, pp. 1-2.

* cited by examiner

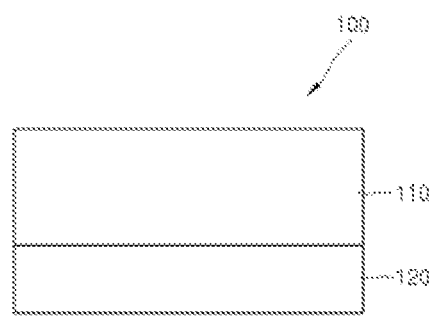

OPTICAL ADHESIVE SHEET

CROSS-REFERENCE TO RELATED APPLICATIONS

The present application is a national phase entry under 35 U.S.C. § 371 of International Application No. PCT/KR2015/006380 filed Jun. 23, 2015, published in Korean, which claims priority from Korean Application No. 10-2014-0120138 filed on Sep. 11, 2014, all of which are incorporated herein by reference.

TECHNICAL FIELD

The present invention relates to an optical adhesive sheet.

BACKGROUND ART

Electronic devices such as PDAs, mobile communication terminals, or navigation systems for vehicles are forming a big market. In these electronic devices, examples of a technical goal to be pursued include thinner devices, lighter devices, power consumption reduction, high resolution devices, high luminance devices, and the like. Touch screen panels capable of manipulating screens by means of touches using fingers and the like are applied to these electronic devices, and a transparent conductive plastic film, and the like are used in order to fill the gap between the panel and an LCD.

Examples thereof include a film which uses a polyethylene terephthalate (PET) film as a base material and has a conductive layer such as indium tin oxide (ITO) formed on one surface of the PET film, and the film is laminated on a conductive glass, a reinforcing material, a decoration film, and the like by an optical adhesive layer or an adhesive sheet. The optical adhesive layer or adhesive sheet requires various physical properties such as optical characteristics and durability.

DETAILED DESCRIPTION OF THE INVENTION

Technical Problem

An exemplary embodiment of the present invention provides an optical adhesive sheet which is excellent in both step absorbency and weatherability.

Technical Solution

An exemplary embodiment of the present invention provides an optical adhesive sheet including a layered structure of a first adhesive layer and a second adhesive layer, in which the first adhesive layer has a glass transition temperature of about $-50°$ C. to about $-30°$ C. and a modulus of about $0.3 \times 10^5$ Pa to about $0.6 \times 10^5$ Pa, and the second adhesive layer has a glass transition temperature of about $-20°$ C. to about $-10°$ C. and a modulus of about $0.7 \times 10^5$ Pa to about $1.0 \times 10^5$ Pa.

The first adhesive layer may be formed by curing a first adhesive composition including a first acrylic resin formed by copolymerizing two or more (meth)acrylic acid ester-based monomers and a crosslinkable monomer containing a hydroxy group.

In a total polymerizable monomer component which forms the first acrylic resin, the content of the two or more (meth)acrylic acid ester-based monomers may be about wt % to about 90 wt %, and the content of the crosslinkable monomer containing a hydroxy group may be about 10 wt % to about 30 wt %.

The first adhesive composition may further include about 0.01 parts by weight to about 5.1 parts by weight of a polyfunctional (meth)acrylate-based compound based on 100 parts by weight of the first acrylic resin.

The first adhesive layer may be formed by UV-curing the first adhesive composition.

The second adhesive layer may be formed by curing a second adhesive composition including a second acrylic resin formed by copolymerizing a (meth)acrylic acid ester-based monomer and a crosslinkable monomer containing a carboxyl group.

In a total polymerizable monomer component which forms the second acrylic resin, the content of the (meth)acrylic acid ester-based monomer may be about 80 wt % to about 95 wt %, and the content of the crosslinkable monomer containing a carboxyl group may be about 5 wt % to about 20 wt %.

The second adhesive composition may further include about 0.01 parts by weight to about 5.1 parts by weight of a polyfunctional (meth)acrylate-based compound based on 100 parts by weight of the second acrylic resin.

The second adhesive layer may be formed by thermally curing the second adhesive composition.

A thickness of the first adhesive layer may be larger than a thickness of the second adhesive layer.

The thickness of the first adhesive layer may be about 50 μm to about 300 μm.

The thickness of the second adhesive layer may be about 5 μm to about 50 μm.

The polyfunctional (meth)acrylate-based compound may include a polyfunctional (meth)acrylate-based monomer, a polyfunctional (meth)acrylate-based oligomer, or a combination thereof.

The polyfunctional (meth)acrylate-based oligomer may have a weight average molecular weight of about 1,000 g/mol to about 3,000 g/mol.

Advantageous Effects

The optical adhesive sheet is excellent in both step absorbency and weatherability.

BRIEF DESCRIPTION OF DRAWINGS

FIG. 1 is a schematic cross sectional view of an optical adhesive sheet according to an exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

Portions having no relation with the description will be omitted in order to explicitly explain the present invention, and the same reference numerals will be used for the same or similar constituent elements throughout the specification.

In the drawings, thicknesses are exaggerated in order to explicitly express some layers and regions. Moreover, in the drawings, the thicknesses of some layers and regions are exaggerated for convenience of explanation.

Hereinafter, the formation of any configuration at "an upper portion (or a lower portion)" of a base material or "on (or below)" of the base material means that any configuration is formed to be brought into contact with an upper surface (or a lower surface) of the base material, and does not limit that another configuration is not included between the base material and any configuration formed on (or below) the base material.

An exemplary embodiment of the present invention provides an optical adhesive sheet including a layered structure of a first adhesive layer and a second adhesive layer, in which the first adhesive layer has a glass transition temperature of about −50° C. to about −30° C., and a modulus of about $0.3 \times 10^5$ Pa to about $0.6 \times 10^5$ Pa at about 23° C., and the second adhesive layer has a glass transition temperature of about −20° C. to about −10° C., and a modulus of about $0.7 \times 10^5$ Pa to about $1.0 \times 10^5$ Pa at about 23° C.

By appropriately adjusting each glass transition temperature and modulus of the first adhesive layer and the second adhesive layer, the first adhesive layer has relatively low glass transition temperature and modulus and thus is excellent in step absorbency capable of absorbing the printing step by a decoration film, and the like, and the second adhesive layer has relatively higher glass transition temperature and modulus than those of the first adhesive layer and thus is excellent in weatherability capable of withstanding harsh conditions such as high temperature and high humidity.

As described above, by including a layered structure of the first adhesive layer which is relatively excellent in step absorbency and the second adhesive layer which is relatively excellent in weatherability, the optical adhesive sheet has an advantage in that both excellent step absorbency and weatherability may be implemented.

FIG. 1 is a schematic cross sectional view of an optical adhesive sheet 100 according to an exemplary embodiment of the present invention.

The optical adhesive sheet 100 includes a layered structure of a first adhesive layer 110 and a second adhesive layer 120.

The first adhesive layer 110 has a glass transition temperature of about −50° C. to about −30° C., and a modulus of about $0.3 \times 10^5$ Pa to about $0.6 \times 10^5$ Pa at about 23° C., and the second adhesive layer 120 has a glass transition temperature of about −20° C. to about −10° C., and a modulus of about $0.7 \times 10^5$ Pa to about $1.0 \times 10^5$ Pa at about 23° C.

The first adhesive layer 110 may be formed by curing a first adhesive composition including a first acrylic resin, and the first acrylic resin may be formed by copolymerizing two or more (meth)acrylic acid ester-based monomers and a crosslinkable monomer containing a hydroxy group.

The first acrylic resin is formed in the form of a copolymer including two or more (meth)acrylic acid ester-based monomers, and thus may lower the crosslinking density of the first acrylic resin, and may coordinate the physical properties of the respective (meth)acrylic acid ester-based monomers, thereby improving the transparency, and the like, unlike the acrylic resin formed in the form of a homopolymer including only one (meth)acrylic acid ester-based monomer.

The kind of (meth)acrylic acid ester-based monomer included in the first acrylic resin may be appropriately adjusted according to the purpose and use of the invention. Further, in the present specification, the copolymer form and the homopolymer form are classified and expressed based on only the kind of (meth)acrylic acid ester-based monomer, independently of a crosslinkable monomer containing a hydroxy group.

As described above, in the first adhesive layer 110 formed by curing the first adhesive composition including the first acrylic resin having a lowered crosslinking density, the glass transition temperature and the modulus are decreased, and as a result, the step absorbency and workability of the first adhesive layer 110 may be improved.

The (meth)acrylic acid ester-based monomer may include a (meth)acrylic acid ester-based monomer including an alkyl group having, for example, about 1 to about 12 carbon atoms, and the glass transition temperature (Tg) and adhesiveness of the first adhesive layer 110 may be easily adjusted by appropriately selecting and using the kind and content ratio thereof. The alkyl group may be straight, branched, or alicyclic.

The (meth)acrylic acid ester-based monomer may include at least two (meth)acrylic acid ester-based monomers selected from the group including, for example, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and a combination thereof.

The crosslinkable monomer containing a hydroxy group, which is included in the first acrylic resin, serves to expand the interval between chains of a polymer resin at the time of copolymerization and thus may impart flexibility by effectively lowering the crosslinking density of the first acrylic resin. As described above, the first adhesive layer 110 formed by curing the first adhesive composition including the first acrylic resin having a lowered crosslinking density has low glass transition temperature and modulus and thus may implement even better step absorbency.

The crosslinkable monomer containing a hydroxy group, which is included in the first acrylic resin, may include at least one selected from the group including, for example, 2-hydroxyethyl (meth)acrylate, 2-hydroxypropyl (meth)acrylate, 4-hydroxybutyl(meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and a combination thereof, but is not limited thereto.

In a total polymerizable monomer component which forms the first acrylic resin, a content of the two or more (meth)acrylic acid ester-based monomers may be, for example, about 70 wt % to about 90 wt %, and a content of the crosslinkable monomer containing a hydroxy group may be, for example, about 10 wt % to about 30 wt %. By including the two or more (meth)acrylic acid ester-based monomers and the crosslinkable monomer containing a hydroxy group at each of the contents within the range, the interval between chains of the first acrylic resin may be appropriately adjusted, so that the first adhesive layer 110 formed by curing the first adhesive composition including the first acrylic resin may implement both excellent viscoelasticity (tack) and step absorbency.

The first adhesive composition may include the first acrylic resin in an amount of, for example, about 70 wt % to about 95 wt %. By including the first acrylic resin at a content within the range, the viscosity of the first adhesive composition may be appropriately adjusted, thereby implementing excellent processability and excellent adhesiveness.

The first adhesive composition may further include a polyfunctional (meth)acrylate-based compound, and may include the polyfunctional (meth)acrylate-based compound in an amount of, for example, about 0.01 parts by weight to about 5.1 parts by weight, and for example, about 0.01 parts by weight to about 0.1 parts by weight, for example, based on 100 parts by weight of the first acrylic resin.

Accordingly, the first adhesive layer 110 formed by curing the first adhesive composition may secure appropriate weatherability while maintaining excellent step absorbency and improving the crosslinking degree.

The polyfunctional (meth)acrylate-based compound may be a compound including two or more double bond functional groups in the molecule thereof, and may include, for example, a polyfunctional (meth)acrylate-based monomer, a polyfunctional (meth)acrylate-based oligomer, or a combination thereof.

The polyfunctional (meth)acrylate-based monomer may act, for example, as a curing agent, and the polyfunctional (meth)acrylate-based oligomer may act, for example, as a crosslinking agent.

The polyfunctional (meth)acrylate-based compound includes both a polyfunctional (meth)acrylate-based monomer and a polyfunctional (meth)acrylate-based oligomer, and thus may relatively further improve the crosslinking degree by the polyfunctional (meth)acrylate-based monomer, and meanwhile, may relatively maintain the crosslinking density at an appropriately low value by the polyfunctional (meth)acrylate-based oligomer.

For example, when the polyfunctional (meth)acrylate-based compound includes both the polyfunctional (meth)acrylate-based monomer and the polyfunctional (meth)acrylate-based oligomer, the weight ratio of the polyfunctional (meth)acrylate-based monomer to the polyfunctional (meth)acrylate-based oligomer, which are included in the first adhesive composition, may be about 1:5 to about 1:10. By including the monomer and the oligomer at a weight ratio within the range, the crosslinking degree and crosslinking density of the first adhesive layer 110 may be appropriately adjusted, thereby simultaneously securing appropriate weatherability while maintaining excellent step absorbency.

The polyfunctional (meth)acrylate-based oligomer may have a weight average molecular weight of, for example, about 1,000 g/mol to about 3,000 g/mol. By having a weight average molecular weight within the range, the crosslinking density of the first adhesive layer 110 formed by curing the first adhesive composition including the same may be appropriately adjusted, thereby appropriately adjusting step absorbency and weatherability.

Examples of the polyfunctional (meth)acrylate-based monomer include bifunctional acrylates such as 1,2-ethylene glycol diacrylate, 1,12-dodecanediol acrylate, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, or 9,9-bis[4-(2-acryloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylate, or tris(meth)acryloxyethyl isocyanurate; tetrafunctional acrylates such as diglycerin tetra(meth)acrylate or pentaerythritol tetra(meth)acrylate; pentafunctional acrylates such as propionic acid-modified dipentaerythritol penta(meth)acrylate; and hexafunctional acrylates such as dipentaerythritol hexa(meth)acrylate, caprolactone-modified dipentaerythritol hexa(meth)acrylate, or urethane (meth)acrylate (for example, reaction products of isocyanate monomers and trimethylolpropane tri(meth)acrylate), but are not limited thereto.

The polyfunctional (meth)acrylate-based oligomer may be, for example, a bifunctional, trifunctional, tetrafunctional, pentafunctional, or hexafunctional (meth)acrylate-based oligomer, and may be specifically a urethane acrylate oligomer, but is not limited thereto.

The first adhesive composition may additionally include a thermal initiator or a photoinitiator, the thermal initiator or the photoinitiator publicly known in the art may be used, and each content thereof may be appropriately adjusted according to the purpose and use of the invention, and is not particularly limited.

The first adhesive layer 110 may be formed, for example, by thermally curing or photo-curing the first adhesive composition. Specifically, the first adhesive layer 110 may be formed by UV curing the first adhesive composition, and accordingly, the preparation process may be simplified, thereby implementing excellent processability.

The UV irradiation may be carried out without limitation by a method publicly known in the UV curing, and for example, a metal halide lamp typically used may be used, but the UV irradiation is not limited thereto.

The second adhesive layer 120 may be formed by curing a second adhesive composition including a second acrylic resin, and the second acrylic resin may be formed by copolymerizing a (meth)acrylic acid ester-based monomer and a crosslinkable monomer containing a carboxyl group.

Since the crosslinkable monomer containing a carboxyl group, which is included in the second acrylic resin, is highly reactive and excellent in cohesion at the time of copolymerization with other monomers, the second adhesive layer 120 formed by curing the second adhesive composition including the second acrylic resin has a relatively high crosslinking density. As a result, the second adhesive layer 120 has high glass transition temperature and modulus, and thus may effectively prevent bubbles generated inside the optical adhesive sheet 100 from being grown, and prevent gases generated from an adhesive base material, and the like from being bubbled, thereby implementing excellent weatherability.

The (meth)acrylic acid ester-based monomer may include at least one selected from the group including, for example, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and a combination thereof.

The crosslinkable monomer containing a carboxyl group may include at least one selected from the group including, for example, acrylic acid, methacrylic acid, 2-(meth)acryloyloxy acetic acid, 3-(meth)acryloyloxy propyl acid, 4-(meth)acryloyloxy butyric acid, acrylic acid dimer, itaconic acid, maleic acid, and a combination thereof, and is not limited thereto.

In a total polymerizable monomer component which forms the second acrylic resin, a content of the (meth)acrylic acid ester-based monomer may be, for example, about 80 wt % to about 95 wt %, and the content of the crosslinkable monomer containing a carboxyl group may be, for example, about 5 wt % to about 20 wt %. The second adhesive layer 120 formed by curing the second adhesive composition may implement excellent weatherability by including the (meth) acrylic acid ester-based monomer and the crosslinkable monomer containing a carboxyl group at each content within the range to appropriately adjust cohesion of the second acrylic resin.

The second adhesive composition may include the second acrylic resin in an amount of, for example, about 10 wt % to about 30 wt %. By including the second acrylic resin at a content within the range, the viscosity of the second adhesive composition may be appropriately adjusted, thereby implementing excellent processability and excellent adhesiveness.

The second adhesive composition may further include a polyfunctional (meth)acrylate-based compound, and the polyfunctional (meth)acrylate-based compound is the same as that described in the first adhesive composition.

The second adhesive composition may further include a polyfunctional (meth)acrylate-based compound, and may include the polyfunctional (meth)acrylate-based compound in an amount of, for example, about 0.01 parts by weight to about 5.1 parts by weight, and for example, about 0.01 parts by weight to about 0.1 parts by weight, for example, based on 100 parts by weight of the second acrylic resin.

The polyfunctional (meth)acrylate-based compound includes both a polyfunctional (meth)acrylate-based monomer and a polyfunctional (meth)acrylate-based oligomer, and thus may relatively further improve the crosslinking degree by the polyfunctional (meth)acrylate-based monomer, and meanwhile, may relatively maintain the crosslinking density at an appropriately low value by the polyfunctional (meth)acrylate-based oligomer.

When the polyfunctional (meth)acrylate-based compound includes both the polyfunctional (meth)acrylate-based monomer and the polyfunctional (meth)acrylate-based oligomer, the weight ratio of the polyfunctional (meth)acrylate-based monomer to the polyfunctional (meth)acrylate-based oligomer, which are included in the second adhesive composition, may be about 1:1 to about 1:3. By including the monomer and the oligomer at a weight ratio within the range, the crosslinking degree and crosslinking density of the second adhesive layer 120 may be appropriately adjusted, thereby simultaneously securing appropriate step absorbency while maintaining excellent weatherability.

The polyfunctional (meth)acrylate-based oligomer may have a weight average molecular weight of, for example, about 1,000 g/mol to about 3,000 g/mol. By having a weight average molecular weight within the range, the step absorbency and weatherability of the second adhesive layer 120 formed by curing the second adhesive composition including the same may be appropriately adjusted.

The second adhesive composition may further include a solvent. The solvent may include at least one selected from the group consisting of toluene, propylene glycol monomethyl ether (PGME), methyl ethyl ketone, dimethylformamide, and a combination thereof, but is not limited thereto.

The second adhesive composition may additionally include a thermal initiator or a photoinitiator, the thermal initiator or the photoinitiator publicly known in the art may be used, and each content thereof may be appropriately adjusted according to the purpose and use of the invention, and is not particularly limited.

The second adhesive layer 120 may be formed, for example, by thermally curing or photo-curing the second adhesive composition. Specifically, the second adhesive layer 120 may be formed by thermally curing the second adhesive composition. By curing the second adhesive composition by means of thermal curing as described above, unreacted acid components contained in the second adhesive composition may be removed by evaporation, so that it is possible to effectively prevent the corrosion of the second adhesive layer 120 from occurring by unreacted acid components which may remain after the curing.

The optical adhesive sheet 100 may be prepared, for example, by separately preparing the first adhesive layer 110 and the second adhesive layer 120, and laminating each adhesive layer by using, for example, hot melting, extrusion, or thermal lamination, and the like, and the second adhesive layer 120 may also be prepared, for example, by first forming the first adhesive layer 110, coating one surface of the first adhesive layer 110 with the second adhesive composition, and curing the second adhesive composition, but the preparation method is not limited thereto, and the optical adhesive sheet 100 may be variously prepared by methods publicly known in the art.

The thickness of the first adhesive layer 110 may be larger than the thickness of the second adhesive layer 120, and accordingly, both excellent step absorbency and weatherability may be implemented by appropriately adjusting properties of the respective adhesive layers.

The thickness of the first adhesive layer 110 may be, for example, about 50 μm to about 300 μm, and specifically, about 50 μm to about 200 μm, and by having a thickness within the range, excellent step absorbency may be implemented without excessively increasing the total thickness of the optical adhesive sheet 100.

The thickness of the second adhesive layer 120 may be about 5 μm to about 50 μm. By having a thickness within the range, excellent weatherability may be implemented without excessively increasing the total thickness of the optical adhesive sheet 100.

The optical adhesive sheet 100 is included in a liquid crystal display, and thus may be used to attach a touch screen panel and a liquid crystal panel to the liquid crystal display. For example, the touch screen panel may be a cover glass integrated touch screen panel by a one glass solution (OGS) method. That is, the liquid crystal display may have a structure in which a cover glass integrated touch screen panel by a one glass solution (OGS) method, the optical adhesive sheet 100, and a liquid crystal panel are sequentially laminated. In the liquid crystal display, the optical adhesive sheet 100 may be laminated in a direction in which the second adhesive layer 120 is brought into contact with an uppermost layer of the liquid crystal panel, and the uppermost layer may be, for example, a polarizing film.

The cover glass integrated touch screen panel is a touch screen panel formed by a one glass solution (OGS) method, and may be formed by depositing a touch electrode onto a transparent base material such as a glass substrate and a transparent plastic sheet without using an ITO film, and the like, unlike a film-type touch screen panel.

The liquid crystal panel may use a liquid crystal panel publicly known in the art, and is not particularly limited.

Hereinafter, Examples and Comparative Examples of the present invention will be described. However, the following Examples are only an Example of the present invention, and the present invention is not limited to the following Examples.

EXAMPLES

Example 1

70 wt % of 2-ethylhexyl acrylate, 10 wt % of isobornyl acrylate, and 20 wt % of 4-hydroxybutyl acrylate were copolymerized by using a bulk thermal polymerization process, thereby preparing a first acrylic resin. 80 wt % of the first acrylic resin, 0.01 parts by weight of hexanediol diacrylate and 0.1 parts by weight of a urethane acrylate oligomer having a weight average molecular weight of 1,000 to 3,000 g/mol based on 100 parts by weight of the first acrylic resin, and 0.3 parts by weight of 2,2-dimethoxy-1,2-diphenylethan-1-one based on 100 parts by weight of the first acrylic resin were mixed and stirred, thereby preparing a first adhesive composition. The first adhesive composition was formed to have a thickness of 150 μm as a coating layer on a PET release film, and then UV rays were irradiated thereon by using a UV black light (368 nm) lamp, thereby preparing a first adhesive layer.

89 wt % of 2-ethylhexyl acrylate and 11 wt % of acrylic acid were copolymerized by using a solution thermal polymerization process, thereby preparing a second acrylic resin. 15 wt % of the second acrylic resin, 0.01 parts by weight of hexanediol diacrylate based on 100 parts by weight of the second acrylic resin, 0.03 parts by weight of benzoyl peroxide based on 100 parts by weight of the second acrylic resin, and a solvent were mixed and stirred, thereby preparing a second adhesive composition. The second adhesive composition was formed to have a thickness of 25 μm as a coating layer on a PET release film, and then was dried by hot wind at 120° C. for 3 minutes, thereby preparing a second adhesive layer.

Subsequently, the first adhesive layer was stacked on the upper portion of the second adhesive layer by a roll-to-roll lamination process, thereby manufacturing an optical adhesive sheet.

Comparative Example 1 (a First Acrylic Resin Includes One (meth)acrylic Acid Ester-Based Monomer)

A first adhesive layer was prepared in the same manner and condition as in Example 1, except that 80 wt % of 2-ethylhexyl acrylate and 20 wt % of 4-hydroxybutyl acrylate were used.

A second adhesive layer was prepared in the same manner and condition as in Example 1.

Subsequently, an optical adhesive sheet was manufactured in the same manner and condition as in Example 1.

Comparative Example 2 (the First Adhesive Composition is Photo-Cured and is Formed as a Single Layer)

A first adhesive composition was prepared in the same manner and condition as in Example 1. The prepared first adhesive composition was formed to have a thickness of 175 μm as a coating layer a PET release film, and then UV rays were irradiated thereon at 0.7 W/cm² for 300 seconds by using a metal UV black light (368 nm) lamp, thereby manufacturing an optical adhesive sheet formed as one layer.

Comparative Example 3 (the Second Adhesive Composition is Thermally Cured and is Formed as a Single Layer)

A second adhesive composition was prepared in the same manner and condition as in Example 1. The second adhesive composition prepared above was formed to have a thickness of 175 μm as a coating layer on a PET release film, and then was dried by hot wind at 120° C. for 3 minutes, thereby manufacturing an optical adhesive sheet formed as one layer.

Comparative Example 4 (Including a Crosslinkable Monomer Containing a Hydroxy Group in an Amount of Less than 10 wt % in a Polymerizable Monomer Component which Forms a First Acrylic Resin)

An optical adhesive sheet was manufactured in the same condition and method as in Example 1, except that 65 wt % of 2-ethylhexyl acrylate, 30 wt % of isobornyl acrylate, and 5 wt % of 4-hydroxybutyl acrylate were copolymerized by using a bulk thermal polymerization process, thereby preparing a first acrylic resin.

Comparative Example 5 (the Polymerizable Monomer Component, which Forms the Second Acrylic Resin, does not Include a Crosslinkable Monomer Containing a Carboxyl Group, but Includes a Crosslinkable Monomer Containing a Hydroxy Group)

An optical adhesive sheet was manufactured in the same condition and method as in Example 1, except that 89 wt % of 2-ethylhexyl acrylate and 11 wt % of hydroxybutyl acrylate were copolymerized by using a solution thermal polymerization process, thereby preparing a second acrylic resin.

Comparative Example 6 (the Polymerizable Monomer Component, which Forms the Second Acrylic Resin, does not Include a Crosslinkable Monomer Containing a Carboxyl Group, but Includes a Nitrogen-Containing Crosslinkable Monomer)

An optical adhesive sheet was manufactured in the same condition and method as in Example 1, except that 89 wt % of 2-ethylhexyl acrylate and 11 wt % of dimethylacrylamide were copolymerized by using a solution thermal polymerization process, thereby preparing a second acrylic resin.

(Evaluation)

Physical properties in Example 1 and Comparative Examples 1 to 6 were evaluated by each of the following methods, and the results are shown in Table 1.

Experimental Example 1: Measurement of Glass Transition Temperature

For each of the first adhesive layers and the second adhesive layers in Example 1 and Comparative Examples 1 and to 6 and the optical adhesive sheets in Comparative Examples 2 and 3, the glass transition temperature was measured by using a differential scanning calorimeter (DSC) (manufactured by TA instrument Co., Ltd.).

Experimental Example 2: Measurement of Modulus

For each of the first adhesive layers and the second adhesive layers in Example 1 and Comparative Examples 1 and 4 to 6 and the optical adhesive sheets in Comparative Examples 2 and 3, the modulus was measured by warming the optical adhesive sheets at a heating rate of 5° C./min from −20° C. to 100° C. using a modulus measuring device (manufactured by TA instrument Co., Ltd., ARES G2).

Measurement Conditions: Pressure (2 N), Circular direction strain (10%), and Thickness (800 μm)

Experimental Example 3: Evaluation of Step Absorbency

The optical adhesive sheet manufactured according to Example 1 was laminated on a soda-lime glass having a thickness of 0.5 mm, and then an ink-printed soda-lime glass having a bezel width of 2 cm, a bezel thickness of 20 μm, and a thickness of 1.1 mm was laminated on the upper portion of the optical adhesive sheet to form a laminate, and the laminate was subjected to an autoclave process under conditions of 5 bar and 60° C. for 30 minutes, and then was left to stand in a high temperature and high humidity chamber of 85° C./85 RH % for 24 hours, and then the bubble generation degree was observed by the unaided eye.

For each of the optical adhesive sheets manufactured in Comparative Examples 1 to 6, the step absorbency was measured in the same manner and condition as in Example 1.

Experimental Example 4: Evaluation of Weatherability

A treatment-free polarizing film was laminated on a soda-lime glass having a thickness of 1.1 mm, the optical adhesive sheet manufactured according to Example 1 was laminated on the upper portion of the polarizing film, and then an ITO PET film (manufactured by Nitto Denko Corporation, V150) was laminated on the upper portion of the optical adhesive sheet to form a laminate, such that a hard coating surface of the ITO PET film was brought into contact with the optical adhesive sheet, the laminate was subjected to an autoclave process under conditions of 5 bar and 60° C. for 30 minutes, and then was left to stand in a high temperature and high humidity chamber of 85° C./85 RH % for 24 hours, and then the bubble generation degree was observed by the unaided eye.

For each of the optical adhesive sheets manufactured in Comparative Examples 1 to 6, the weatherability was evaluated in the same manner and condition as in Example 1.

TABLE 1

| | Glass transition temperature (° C.) | Modulus (Pa) (25° C.) | Step absorbency | Weatherability |
|---|---|---|---|---|
| Example 1 | First adhesive layer: −49 Second adhesive layer: −17 | First adhesive layer: 0.42 × $10^5$ Second adhesive layer: 0.72 × $10^5$ | ○ | ○ |
| Comparative Example 1 | First adhesive layer: −58 Second adhesive layer: −17 | First adhesive layer: 0.37 × $10^5$ Second adhesive layer: 0.72 × $10^5$ | X | ○ |
| Comparative Example 2 | −49 | 0.42 × $10^5$ | ○ | X |
| Comparative Example 3 | −17 | 0.70 × $10^5$ | X | ○ |
| Comparative Example 4 | First adhesive layer: −33 Second adhesive layer: −17 | First adhesive layer: 0.62 × $10^5$ Second adhesive layer: 0.72 × $10^5$ | X | ○ |
| Comparative Example 5 | First adhesive layer: −49 Second adhesive layer: −25 | First adhesive layer: 0.42 × $10^5$ Second adhesive layer: 0.49 × $10^5$ | ○ | X |
| Comparative Example 6 | First adhesive layer: −49 Second adhesive layer: −47 | First adhesive layer: 0.42 × $10^5$ Second adhesive layer: 0.45 × $10^5$ | ○ | X |

EXPLANATION OF REFERENCE NUMERALS AND SYMBOLS

100: Optical adhesive sheet
110: First adhesive layer
120: Second adhesive layer

The invention claimed is:

1. An optical adhesive sheet comprising a layered structure of a first adhesive layer and a second adhesive layer,
   wherein the first adhesive layer is formed by curing a first adhesive composition comprising 1) a first acrylic resin formed by copolymerizing two or more (meth)acrylic acid ester-based monomers and a crosslinkable monomer containing a hydroxy group; and 2) a first polyfunctional (meth)acrylate-based compound,
   wherein the second adhesive layer is formed by curing a second adhesive composition comprising a second acrylic resin formed by copolymerizing 80 wt % to 95 wt % of a (meth)acrylic acid ester-based monomer and 5 wt % to 20 wt % of a crosslinkable monomer containing a carboxyl group,
   wherein the first polyfunctional (meth)acrylate-based compound is a combination of a polyfunctional (meth)acrylate-based monomer and a polyfunctional (meth)acrylate-based oligomer, wherein a weight ratio of the polyfunctional (meth)acrylate-based monomer to the polyfunctional (meth)acrylate-based oligomer is 1:5 to 1:10,
   wherein the first adhesive layer has a glass transition temperature of −50° C. to −30° C. and a modulus of $0.3 \times 10^5$ Pa to $0.6 \times 10^5$ Pa, and
   the second adhesive layer has a glass transition temperature of −20° C. to −10° C. and a modulus of $0.7 \times 10^5$ Pa to $1.0 \times 10^5$ Pa.

2. The optical adhesive sheet of claim 1, wherein in a total polymerizable monomer component which forms the first acrylic resin, a content of the two or more (meth)acrylic acid ester-based monomers is 70 wt % to 90 wt %, and a content of the crosslinkable monomer containing a hydroxy group is 10 wt % to 30 wt %.

3. The optical adhesive sheet of claim 1, wherein the first adhesive composition comprises 0.01 parts by weight to 5.1 parts by weight of the first polyfunctional (meth)acrylate-based compound based on 100 parts by weight of the first acrylic resin.

4. The optical adhesive sheet of claim 1, wherein the first adhesive layer is formed by UV-curing the first adhesive composition.

5. The optical adhesive sheet of claim 1, wherein the second adhesive composition further comprises 0.01 parts by weight to 5.1 parts by weight of a second polyfunctional (meth)acrylate-based compound based on 100 parts by weight of the second acrylic resin.

6. The optical adhesive sheet of claim 1, wherein the second adhesive layer is formed by thermally curing the second adhesive composition.

7. The optical adhesive sheet of claim 1, wherein a thickness of the first adhesive layer is larger than a thickness of the second adhesive layer.

8. The optical adhesive sheet of claim 7, wherein the thickness of the first adhesive layer is 50 μm to 300 μm.

9. The optical adhesive sheet of claim 7, wherein the thickness of the second adhesive layer is 5 μm to 50 μm.

10. The optical adhesive sheet of claim 1, wherein the first polyfunctional (meth)acrylate-based oligomer has a weight average molecular weight of 1,000 g/mol to 3,000 g/mol.

11. The optical adhesive sheet of claim 5, wherein the second polyfunctional (meth)acrylate-based compound comprises a polyfunctional (meth)acrylate-based monomer, a polyfunctional (meth)acrylate-based oligomer, or a combination thereof.

12. The optical adhesive sheet of claim 11, wherein the polyfunctional (meth)acrylate-based oligomer has a weight average molecular weight of 1,000 g/mol to 3,000 g/mol.

13. The optical adhesive sheet of claim 1, wherein the crosslinkable monomer containing a carboxyl group is acrylic acid.

* * * * *